United States Patent
Greca

(10) Patent No.: US 7,909,333 B2
(45) Date of Patent: Mar. 22, 2011

(54) UNITIZED SEAL ASSEMBLY HAVING SOFT RETENTION AND DEBRIS EXPULSION FEATURES

(75) Inventor: Gerald A. Greca, Carleton, MI (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 634 days.

(21) Appl. No.: 11/853,861

(22) Filed: Sep. 12, 2007

(65) Prior Publication Data

US 2008/0169611 A1 Jul. 17, 2008

Related U.S. Application Data

(60) Provisional application No. 60/884,780, filed on Jan. 12, 2007.

(51) Int. Cl.
*F16J 15/32* (2006.01)

(52) U.S. Cl. ......... 277/349; 277/551; 277/577; 384/448

(58) Field of Classification Search .................. 277/551, 277/552, 570, 349, 577, 317; 384/448
See application file for complete search history.

(56) References Cited

U.S. PATENT DOCUMENTS

| | | | | |
|---|---|---|---|---|
| 4,126,320 A | * | 11/1978 | Pendleton | ..................... 277/568 |
| 4,252,329 A | * | 2/1981 | Messenger | ..................... 277/551 |
| 4,384,387 A | | 5/1983 | Pachuta | |
| 4,434,985 A | | 3/1984 | Sonnerat | |
| 4,448,426 A | * | 5/1984 | Jackowski et al. | ............. 277/353 |
| 4,667,968 A | * | 5/1987 | Nash et al. | ..................... 277/568 |
| 4,723,350 A | * | 2/1988 | Kobayashi et al. | ............. 29/417 |
| 4,936,591 A | * | 6/1990 | Romero | ........................ 277/551 |
| 5,096,207 A | | 3/1992 | Seeh et al. | |
| 5,149,207 A | | 9/1992 | Vignoito | |
| 5,209,499 A | * | 5/1993 | Ruff et al. | ..................... 277/551 |
| 5,269,536 A | | 12/1993 | Matsushima et al. | |
| 5,431,413 A | | 7/1995 | Hajzler | |
| 5,890,812 A | | 4/1999 | Marcello et al. | |
| 5,947,611 A | | 9/1999 | Nagase | |
| 6,149,158 A | | 11/2000 | Tripathy | |
| 6,170,992 B1 | * | 1/2001 | Angelo et al. | ................ 384/477 |
| 6,471,215 B1 | | 10/2002 | Drago et al. | |
| 6,485,185 B1 | | 11/2002 | Conway, Jr. et al. | |

(Continued)

FOREIGN PATENT DOCUMENTS

FR 2631672 11/1989

*Primary Examiner* — Alison K Pickard
(74) *Attorney, Agent, or Firm* — Roberts L. Stearns; Dickinson Wright, PLLC

(57) ABSTRACT

A seal assembly has an inner wear sleeve with an axially extending tubular body. A flange extends radially outwardly from the body. An outer seal component has an axially extending tubular outer wall with a flange extending radially inwardly therefrom to support at least one dynamic seal lip in sealing engagement with the inner sleeve body. The outer seal component includes an annular retention lip disposed axially outwardly of the wear sleeve flange. The retention lip extends radially inwardly of a radially outer edge of the flange and is deflectable in an axial direction to enable the flange of the wear sleeve to be forced axially thereby during assembly, whereupon the retention flange returns to its non-deflected position to inhibit removal of the wear sleeve in the reverse axial direction. The annular retention flange has at least one axially extending debris expulsion slot for the escapement of debris.

16 Claims, 2 Drawing Sheets

U.S. PATENT DOCUMENTS

| | | |
|---|---|---|
| 6,550,973 B2 | 4/2003 | Yeo |
| 6,595,695 B1 | 7/2003 | Goto |
| 6,637,754 B1 | 10/2003 | Ohtsuki et al. |
| 6,682,076 B1 | 1/2004 | Hosoda et al. |
| 6,729,623 B2 * | 5/2004 | Visconti .................. 277/549 |
| 6,979,001 B2 | 12/2005 | Ohtsuki et al. |
| 7,055,828 B2 * | 6/2006 | Hatch et al. ............. 277/570 |
| 7,056,028 B2 | 6/2006 | Hosoda et al. |
| 7,118,280 B2 | 10/2006 | Vignotto et al. |
| 7,455,459 B2 * | 11/2008 | Toth et al. ............... 384/448 |
| 7,594,664 B2 * | 9/2009 | Maskaliunas ............ 277/551 |
| 2001/0000713 A1 * | 5/2001 | Nakamura et al. ....... 384/448 |
| 2006/0038354 A1 | 2/2006 | Toth et al. |
| 2006/0188189 A1 | 8/2006 | Serafini et al. |
| 2007/0090604 A1 * | 4/2007 | Shibayama et al. ...... 277/349 |
| 2007/0290451 A1 * | 12/2007 | Yager ...................... 277/551 |
| 2008/0054572 A1 * | 3/2008 | Maskaliunas ............ 277/551 |

* cited by examiner

US 7,909,333 B2

UNITIZED SEAL ASSEMBLY HAVING SOFT RETENTION AND DEBRIS EXPULSION FEATURES

CROSS-REFERENCE TO RELATED APPLICATION

This application claims the benefit of U.S. Provisional Application Ser. No. 60/884,780, filed Jan. 12, 2007, which is incorporated herein by reference in its entirety.

BACKGROUND OF THE INVENTION

1. Technical Field

This invention relates generally to dynamic oil seals of the type having an outer annular dynamic seal component and an associated inner annular wear sleeve component in which the components are unitized to resist axial separation while permitting relative operational rotation.

2. Related Art

Dynamic seals typically include an outer annular seal component which is mountable in a housing about an opening and sometimes an inner annular wear sleeve component that is mounted on and rotatable with a shaft extending through the opening. The outer seal component typically has one or more annular seal lips that ride to perfect a dynamic fluid seal between the shaft and housing. It is also known to "unitize" the wear sleeve with the seal component in a way the keeps the components from separating from one another along an axial direction during shipping and handling while still enabling the components to rotate relative to one another during use. One approach to wear sleeve retention is to bend an inner axial end of the wear sleeve radially outwardly following assembly to overlap a metal carrier flange of the outer seal component to preclude axial separation. Another approach, as illustrated for example in U.S. Pat. No. 6,149,158, is to pre-curl the axially inner end of the wear sleeve radially outwardly so that upon assembly of the wear sleeve with the outer seal component, the curl of the wear sleeve pushes past the dynamic seal element of the outer seal component, but then is retained against reverse movement. While these are effective approaches to retaining a wear sleeve on an outer seal component, it is the belief of the present inventor that there are alternative ways to retain the wear sleeve that do not require post-assembly forming of the wear sleeve or interaction with the dynamic seal element in order to retain the wear sleeve on the outer seal component.

In commonly owned and co-pending U.S. patent application Ser. No. 11/371,405, a seal assembly is disclosed in which the wear sleeve component is unitized with the outer seal component by means of an elastomeric retention lip carried on the sealing component. The retention lip overlaps the end of a radially outwardly extending flange of the wear sleeve and is arranged axially opposite the dynamic seal lip of the seal component with the flange therebetween. The overlapping retention lip extends slightly radially inwardly of the edge of the flange and deforms elastically when the wear sleeve is forced axially into assembly with the seal component to permit the end of the flange to pass by, after which the retention lip returns to shape to capture the flange and thereby support the components against disassembly in the reverse direction.

SUMMARY OF THE INVENTION

According to one aspect of the invention, a seal assembly includes a radially inner wear sleeve arranged for self retention with an outer seal component. The inner wear sleeve has an axially extending tubular wear sleeve body mountable about and rotatable with a shaft relative to the outer seal component. A flange extends radially outwardly from the body of the wear sleeve adjacent one end. The outer seal component has an axially extending outer wall with a flange extending radially inwardly from the outer wall and supporting at least one radially extending dynamic seal lip in sealing engagement with the wear sleeve body. The outer seal component includes an elastomeric annular retention lip disposed axially outwardly of the wear sleeve flange and extending radially inwardly of a radially outer edge of the flange. The retention lip is elastically and resiliently deflectable in an axial direction to enable the flange of the wear sleeve to be forced axially past the retention flange during assembly of the wear sleeve to the outer case. After the flange of the wear sleeve is forced axially past the retention flange, the retention flange is able to return to its original non-deflected shape, whereupon the retention flange is spaced axially from the flange of the wear sleeve to form a labyrinth passage to facilitate sealing and to prevent separation of the wear sleeve in the reverse axial direction. The annular retention flange further includes at least one debris expulsion slot presenting an axially extending passage through the retention flange for the escapement of debris.

BRIEF DESCRIPTION OF THE DRAWINGS

These and other aspects, features and advantages of this invention will become readily appreciated when considered in connection with the detailed description of presently preferred embodiments and best mode, appended claims and accompanying drawings, in which:

DETAILED DESCRIPTION OF PRESENTLY PREFERRED EMBODIMENTS

Figure 1:
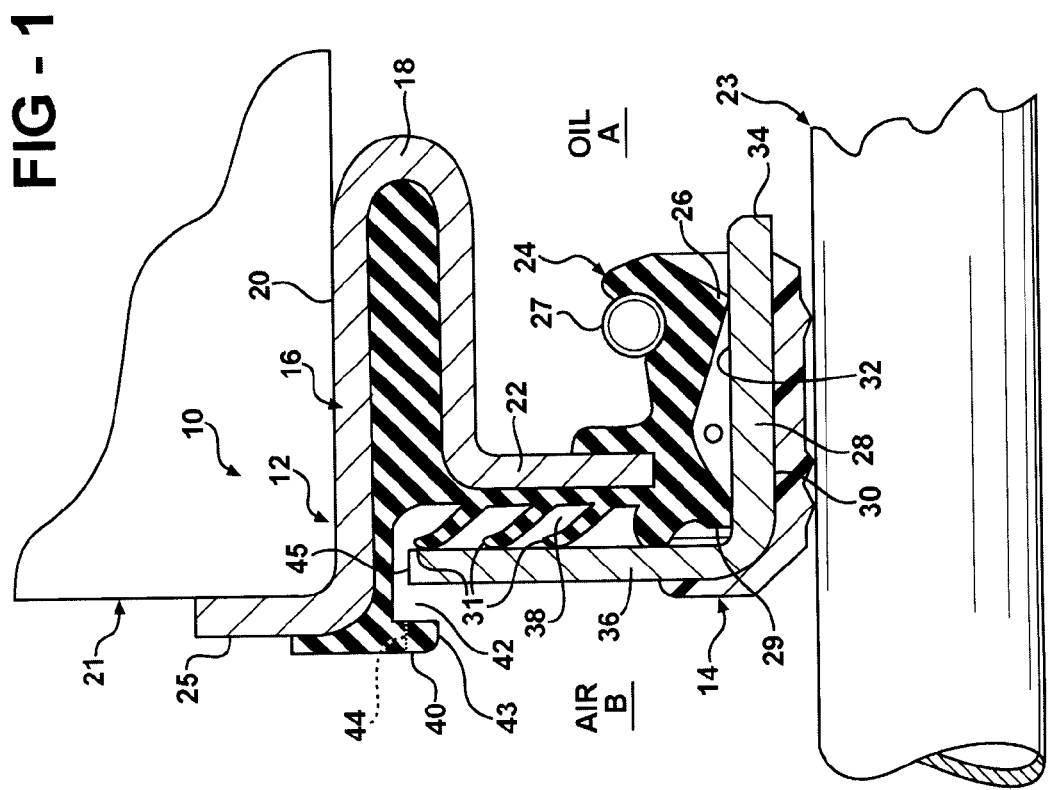
FIG. 1 is cross-sectional view of a seal assembly constructed according to one presently preferred embodiment of the invention.

Referring in more detail to the drawings, FIG. 1 illustrates a seal assembly constructed according to one presently preferred embodiment of the invention shown generally at 10. The seal assembly includes an outer annular seal component 12 and an inner annular wear sleeve component 14. The components 12, 14 are made separately from one another and are assembled for use such that they rotate relative to one another in use. Upon being assembled, the outer seal component 12 retains the inner wear sleeve component 14 in an assembled state by preventing the inner wear sleeve component 14 from moving axially toward a disassembled state.

The seal component 12 includes an outer annular carrier 16 made of a rigid material, such as metal (e.g., steel), for example. The carrier 16 includes an outer generally cylindrical body portion 18 whose outer surface 20 is able to be press-fit or otherwise mounted in an opening of a housing 21 through which a rotatable shaft 23 extends to provide a fluid-tight dynamic seal between the shaft 23 and housing 21. To facilitate locating the carrier 16, an end of the carrier can be formed having a radially outwardly annular mount flange 25 arranged for seating engagement with a mating surface of the housing 21. The carrier 16 further includes a radially inwardly projecting seal flange 22 arranged transverse to the body portion 18. At least one dynamic annular seal element 24 is secured to the flange 22 to provide a primary annular seal of the assembly. The seal element 24 may be fabricated of an elastomeric material (FIG. 1), or other materials, as desired. The seal element 24 may be secured to the flange 22 by a suitable adhesive, bonding, clamping or other means of mounting the seal element in position on the flange 22. The seal element 24 presents a radially inner seal lip 26 that is arranged to engage a functional sealing surface associated with the shaft 23 in order to provide a dynamic seal, and namely the wear sleeve component 14, as explained further below. The seal lip 26 divides the seal into an axially interior oil side A on one side of the seal lip 26 and an axially outer air side B on the axially opposite side of the seal lip 26.

The sealing element 24 of FIG. 1 is made of an elastomer, such as rubber, for example, and may be molded to the flange 22 with the sealing element being backed by a spring 27. The sealing element 24 may also be molded as one piece of the same material with a dust or debris exclusion lip 29 that extends axially away from the seal lip 26 for engagement with the shaft 23. Further, additional dust and debris exclusion lips 31 can be formed as one piece of the same material with the seal lip 26 and debris exclusion lip 29, wherein the additional debris exclusion lips 31 extend axially from the flange 22 toward the air side B for engagement with the inner wear sleeve component 14.

The wear sleeve component 14 includes a generally cylindrical body portion 28 axially aligned radially inwardly from the body portion 18 of the outer carrier 16. The wear sleeve body portion 28 includes an inner surface 30 that is dimensioned to be disposed in a close fit about an outer surface of the shaft (e.g., press-fit) and an outer surface 32 that presents a sealing or running surface for the primary seal lip 26. The body portion 28, when mounted on the shaft 23, is caused to rotate with the shaft 23, wherein the outer surface 32 effectively presents a controlled outer sealing surface for engagement with the seal lip 26.

The body portion 28 of the wear sleeve 14 includes an axial inner end 34 oriented for receipt on the oil side A of the seal lip 26. The inner end 34 can be constructed free of any radially outwardly extending flanges such that the inner end is cylindrically straight to form an extension of the running surface 32, or it may taper radially inwardly, if desired. The inner end 34 presents a leading end of the wear sleeve 14 in relation to assembling the wear sleeve component 14 with the outer seal component 12. The wear sleeve component 14 includes an end flange 36 that is provided at the air side B of the body portion 28 axially opposite the inner end 34. The end flange 36 extends radially outwardly from the body portion 28 and may be generally parallel to the seal flange 22, but spaced axially therefrom to provide an annular air gap 38. The dust and debris exclusion lips 31 can be arranged for engagement with the end flange 36 to prevent contaminants from entering the oil side A. To assemble the components 12, 14, the leading end 34 of the wear sleeve component 14 is extended axially through the seal element 24 from the air side B, thereby causing the seal lip 26 to move radially outwardly about and sealingly engage the outer running surface 32 of the wear sleeve component 14.

Figure 4:
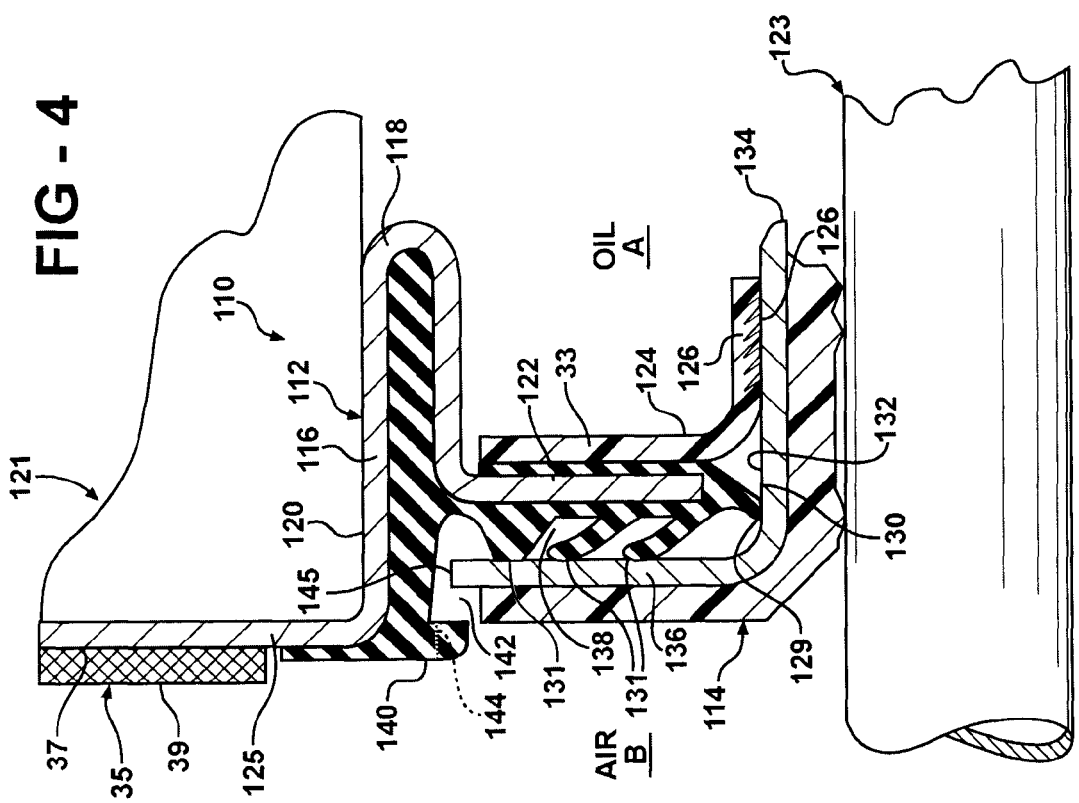
FIG. 4 is cross-sectional view of a seal assembly constructed according to another presently preferred embodiment of the invention.

The carrier 16 of the seal component 12 includes a soft annular retention lip or flange 40 projecting radially inwardly of the carrier 16 in axially outward spaced relation to the seal flange 22 such that the end flange 36 of the inner wear sleeve component 14 is received in a clearance relation between the retention lip 40 and the flange 22. Accordingly, the retention lip 40 is in adjacent relationship to the end flange 36, such that the end flange 36 is arranged axially between the retention lip 40 and the primary seal lip 26. The retention flange 40 can be made of an elastomer, such as that used to make the seal lip 26 of FIG. 1, and can be formed or molded as one piece with the seal lip 26. The retention lip 40 is exposed to the air side B of the seal assembly and acts in conjunction with the end flange 36 of the wear sleeve component 14 to provide a labyrinth seal 42 in association with the air gap 38. The retention lip 40 is shown as extending radially inwardly from the mount flange 25, and can be formed generally coplanar therewith. The retention lip 40 overlaps the end of the end flange 36, such that a radially inner most margin or edge 43 of the retention lip 40 lies radially inwardly of a radially outermost edge 45 of the end flange 36. This overlap presents an initial barrier axially to positioning the end flange 36 axially inwardly of the retention lip 40 during assembly. The axial spacing between the retention lip 40 and the seal flange 22 is such that, during assembly with sufficient axially applied force, the end portion of the end flange 36 initially interfering with the retention lip 40 can be pushed past the retention lip 40. The retention lip 40 is elastically and resiliently deflected by the end flange 36 to allow the end flange 36 to pass thereby, after which, the retention lip 40 returns to its original non-deflected shape in radially overlapping relation to the outermost edge 45 of the end flange 36, as shown in FIGS. 1 and 4. This radial overlap of the retention lip 40 and end flange 36 acts to retain the wear sleeve component 14 from becoming inadvertently disassembled in the reverse axial direction during shipping and handling so that the wear sleeve 14 is unitized with the seal component 12 in both axial directions, but still able to rotate relative to the seal component 12.

Figure 2:
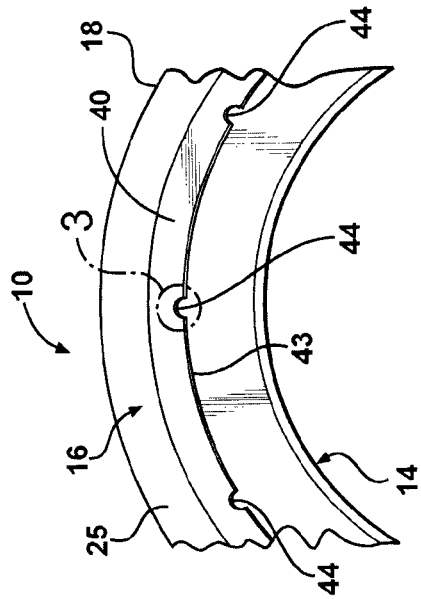
FIG. 2 is a fragmentary plan view of a retaining lip of the seal assembly of FIG. 1.
Figure 3:
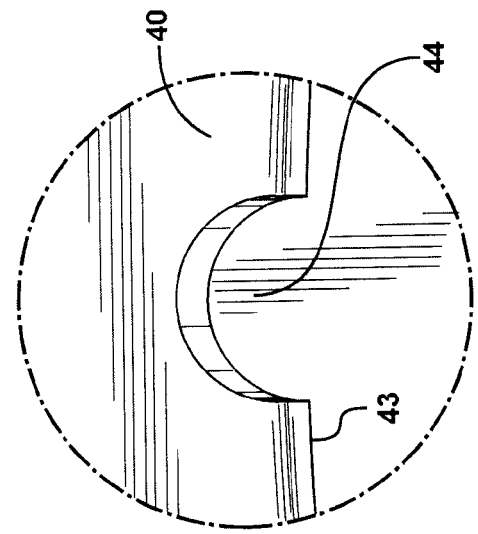
FIG. 3 is an enlarged view of a portion of the retaining lip.

As shown best in FIGS. 2 and 3, the retention lip 40 is formed with at least one and may be formed with a plurality of slots or openings 44. These slots 44 may open or extend radially outwardly into the inner most radial edge 43 of the retention lip 40 and may extend only partially or the full radial width of the retention lip 40. The slots 44 may be equally spaced circumferentially about the lip 40. The slots 44 are open to the space 38 that forms at least a portion of the labyrinth seal 42 and act as egress slots or ports for the escapement of contaminants, also referred to as debris, that enters the space axially inwardly of the retention lip 40. Contaminants can include water, mud, dirt, dust, and other fluids or solids that are undesirable in the space and which would fall or drain out the slots 44 either during operation of the seal or when the seal is stationary.

Figure 5:
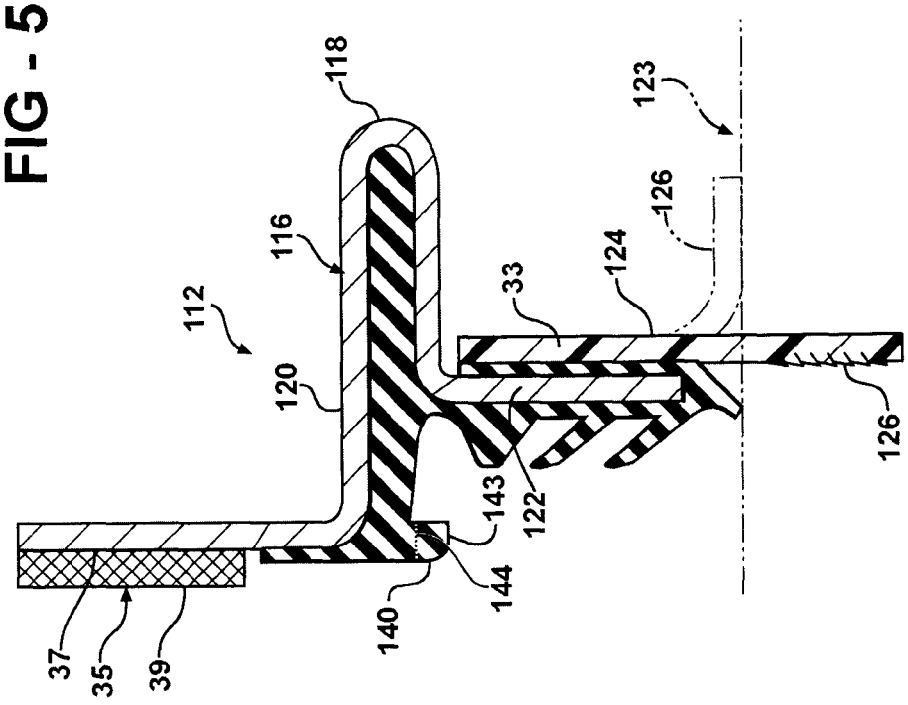
FIG. 5 is a cross-sectional view of an outer seal component of the seal assembly of FIG. 4.

Referring now to FIGS. 4 and 5, another presently preferred embodiment of a seal assembly is illustrated generally at 110, wherein like reference numbers offset by 100 are used to identify like features. The seal assembly has an outer seal component 112 and an inner wear sleeve component 114. The inner wear sleeve component 114 is constructed generally the same as described above, and thus, has a cylindrical body portion 128 with an inner surface 130 dimensioned for a close fit about an outer surface of a shaft 123 with an outer surface 132 that presents a sealing or running surface. The body portion 128 includes an axial inner end 134 that is cylindrically straight and an end flange 136, as described above.

As with the embodiment above, the outer seal component 112 includes an outer annular carrier 116 having an outer generally cylindrical body portion 118 whose outer surface 120 is able to be press-fit or otherwise mounted in an opening of a housing 121. An end of the carrier 116 is formed having a radially outwardly annular mount flange 125 arranged for seating engagement with a mating surface of the housing 121. The carrier 116 has a radially inwardly projecting seal flange 122 arranged transverse to the body portion 118. At least one dynamic annular seal element 124 is secured to the flange 122 to provide a primary annular seal of the assembly. Unlike the embodiment above, the seal element 124 here is fabricated at least in part using a PTFE (polytetrafluoroethylene) seal member 33 bonded to the flange 122, such as by a backing of an elastomer, for example rubber or the like. Otherwise, the seal element 124 may be secured to the flange 122 by a suitable adhesive, bonding, clamping or other means. The PTFE member 33 has a seal lip 126 that is caused in use to lay down against the wear sleeve component 114 and may extend either toward to the oil side A or toward the air side B.

As described above in the previous embodiment the sealing element 124 may also include a dust or debris exclusion lip 129 that extends axially away from the seal lip 126 for engagement with the shaft 123. Further, additional dust and debris exclusion lips 131 can be formed as one piece of the same material with the debris exclusion lip 129, but separately from the seal lip 126, wherein the additional debris exclusion lips 131 extend axially from the flange 122 toward the air side B for engagement with the inner wear sleeve component 114.

The carrier 116 includes a soft annular retention lip or flange 140 as described in the previous embodiment. The retention flange 140 can be made of an elastomer, such as that used to make the debris exclusion lips 129, 131. The retention lip 140, although being constructed from separate material as the seal lip 126, is constructed, arranged and functions the same as described above. Accordingly, the retention flange 140 has a radially inner most margin or edge 143 that lies radially inwardly of a radially outermost edge 145 of the end flange 136 to form a labyrinth seal passage 142, with slots 144 extending radially therein.

The seal assembly 110 has an additional encoder feature or ring 35 mounted on an axially outward facing surface 37 of the mount flange 125. The encoder or ring 35 has an exposed face 39 comprising a plurality of magnetically polarized sectors alternating between North and South polarities for communication with a sensor, such a strain-based variable reluctance (VR) sensor (not shown). The VR sensor is positioned proximate the exposed face 39 of the encoder ring 35 and projects its magnetic field toward the polarized sectors so as to produce a sinusoidal wave current in response to movement of the polarized sectors through the magnetic field. The sinusoidal wave current will have a frequency which is proportional to the relative rotational velocity. Preferably, although not necessarily, the encoder ring 35 is of the elastomer based ceramic magnetic type whose general composition is known. The encoder ring 35 may be divided into any number of polarized sectors provided the number of such sector is even and their arcuate dimension is substantially equal. Each sector presents a North or South polarization on the exposed face 39 which is different from that of the adjacent sectors, such that the exposed face 39 alternates in North-South increments regularly about its circumferential measure.

Because the magnetic strength of such encoder rings 35 are fairly weak, the amount of fluxuation in the magnetic field produced by the VR sensor would typically be too weak to detect. However, because the flange 125 is preferably composed of a carbon steel material and backs the encoder ring 35 in full surface-to-surface contact, the magnetic field strength produced by the encoder ring 35 is enhanced to the point where the VR sensor is capable of detecting and being influenced by the magnetic discontinuities.

It is to be understood that other embodiments of the invention which accomplish the same function are incorporated herein within the scope of any ultimately allowed patent claims.

What is claimed is:

1. A seal assembly, comprising:
an inner wear sleeve having a tubular body extending between axially opposite ends and mountable for rotation with a shaft, said sleeve having a flange extending radially outwardly from said body adjacent one of said ends to a radially outermost portion;
an outer seal component having an outer wall for receipt in a housing with a flange extending radially inwardly from said outer wall, said flange supporting at least one dynamic seal having a seal lip in sealing engagement with said tubular body of said wear sleeve, said outer wall supporting an elastically resilient annular retention lip extending radially inwardly from said outer wall about the entire circumference of said outer wall to a radially inner most portion that is radially inward from said radially outermost portion of said flange of said inner wear sleeve, said retention lip being axially deflectable to allow said flange of said inner wear sleeve to pass axially thereby during assembly and returning resiliently to a non-deflected state, said retention lip being spaced axially and out of engagement from said flange of said inner wear sleeve in said non-deflected state to provide a non-contact labyrinth passage extending radially and axially between said retention lip and said flange and having at least one expulsion opening extending radially outwardly into said radially inner most portion, said opening being open to said labyrinth passage to allow debris to escape from said labyrinth passage.

2. The seal assembly of claim 1 wherein the retention lip has a plurality of said expulsion openings.

3. The seal assembly of claim 2 wherein said expulsion openings are spaced circumferentially equidistant from one another.

4. The seal assembly of claim 2 wherein said expulsion openings are formed as slots extending radially outwardly into said radially inner most portion of said retention lip.

5. The seal assembly of claim 1 wherein said retention lip and said at least one dynamic seal are formed as one piece of material.

6. The seal assembly of claim 1 wherein said outer seal component has a mounting flange extending radially outwardly from said outer wall for engagement with the housing, said retention lip extending radially inwardly from said mounting flange and generally coplanar therewith.

7. The seal assembly of claim 6 further including an annular magnetic encoder ring attached to said mounting flange and facing an air side of said seal assembly.

8. The seal assembly of claim 1 wherein said dynamic seal extends axially away from said retention lip.

9. The seal assembly of claim 8 further including at least one dust lip formed as one piece of the same material with the dynamic seal, said at least one dust lip extending axially away from said seal lip.

10. The seal assembly of claim 9 wherein said at least one dust lip extends axially away from said flange of said outer seal component and engages said flange of said inner wear sleeve.

11. The seal assembly of claim 10 wherein said at least one dust lip includes another dust lip extending radially inwardly from said outer seal component flange, said another dust lip engaging said inner wear sleeve body.

12. The seal assembly of claim 9 wherein said dust lip and said retention lip are formed as one piece of the same material.

13. The seal assembly of claim 1 wherein said retention lip and said dynamic seal are constructed from dissimilar materials.

14. The seal assembly of claim 13 wherein said retention lip is formed from rubber and said dynamic seal is constructed from PTFE.

15. The seal assembly of claim 14 further including a dust lip formed as one piece of the same material with said retention lip.

16. The seal assembly of claim 15 wherein said dust lip extends axially away from said seal lip.

* * * * *